United States Patent
Garmon et al.

(10) Patent No.: US 10,396,630 B2
(45) Date of Patent: Aug. 27, 2019

(54) SYSTEM AND METHOD FOR COOLING WINDINGS OF GENERATOR ROTOR

(71) Applicant: Siemens Energy, Inc., Orlando, FL (US)

(72) Inventors: Michael D. Garmon, Orlando, FL (US); Raul Ricardo Rico, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 316 days.

(21) Appl. No.: 15/631,571

(22) Filed: Jun. 23, 2017

(65) Prior Publication Data

US 2018/0375403 A1    Dec. 27, 2018

(51) Int. Cl.

| | |
|---|---|
| *H02K 9/19* | (2006.01) |
| *H02K 3/24* | (2006.01) |
| *H02K 1/32* | (2006.01) |
| *H02K 9/10* | (2006.01) |
| *H02K 9/00* | (2006.01) |

(52) U.S. Cl.
CPC ............... *H02K 9/19* (2013.01); *H02K 1/32* (2013.01); *H02K 3/24* (2013.01); *H02K 9/10* (2013.01); *H02K 9/005* (2013.01)

(58) Field of Classification Search
CPC .. H02K 9/19; H02K 1/32; H02K 3/24; H02K 9/10; H02K 9/005
See application file for complete search history.

(56) References Cited

U.S. PATENT DOCUMENTS

| | | | | |
|---|---|---|---|---|
| 2,894,155 | A * | 7/1959 | Labastie | H02K 9/19 188/264 D |
| 6,727,609 | B2 * | 4/2004 | Johnsen | H02K 1/32 310/52 |
| 7,156,195 | B2 * | 1/2007 | Yamagishi | F16H 57/0476 180/65.1 |
| 9,306,433 | B2 * | 4/2016 | Sten | H02K 9/193 |
| 9,762,106 | B2 * | 9/2017 | Gauthier | H02K 9/19 |
| 2008/0024020 | A1 * | 1/2008 | Iund | H02K 5/20 310/61 |
| 2016/0149452 | A1 | 5/2016 | Garmon et al. | |
| 2016/0211724 | A1 | 5/2016 | Garmon et al. | |

* cited by examiner

*Primary Examiner* — Mohamad A Musleh

(57) ABSTRACT

A system for cooling windings of generator rotor is presented. The system includes a cooling passage including inlet and outlet radial bores radially extending into rotor shaft extension, inlet and outlet axial bores axially extending within rotor shaft extension, first and second radial bores radially extending from cavities under two retaining rings into rotor shaft extension, and an axial passage through windings from cavity under retaining ring at turbine end side to cavity under retaining ring at excitation end side. A coolant flows through the cooling passage and directly cools windings by traveling through entire windings. The system uses non-explosive fluid as coolant eliminating using hydrogen as coolant and provides sufficient direct cooling of windings of a high power density generator rotor without extensive piping.

20 Claims, 4 Drawing Sheets

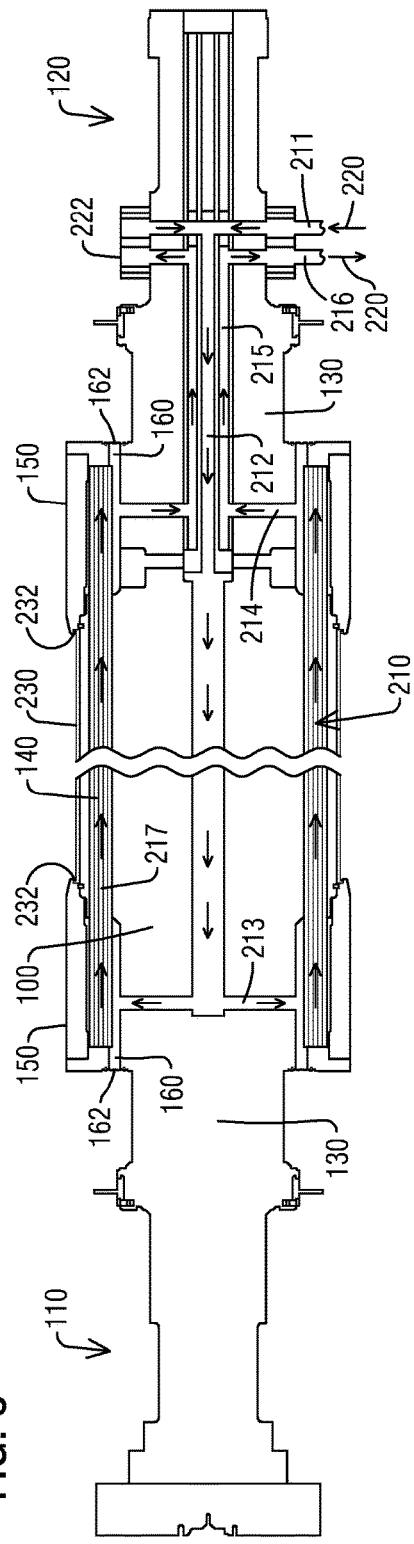
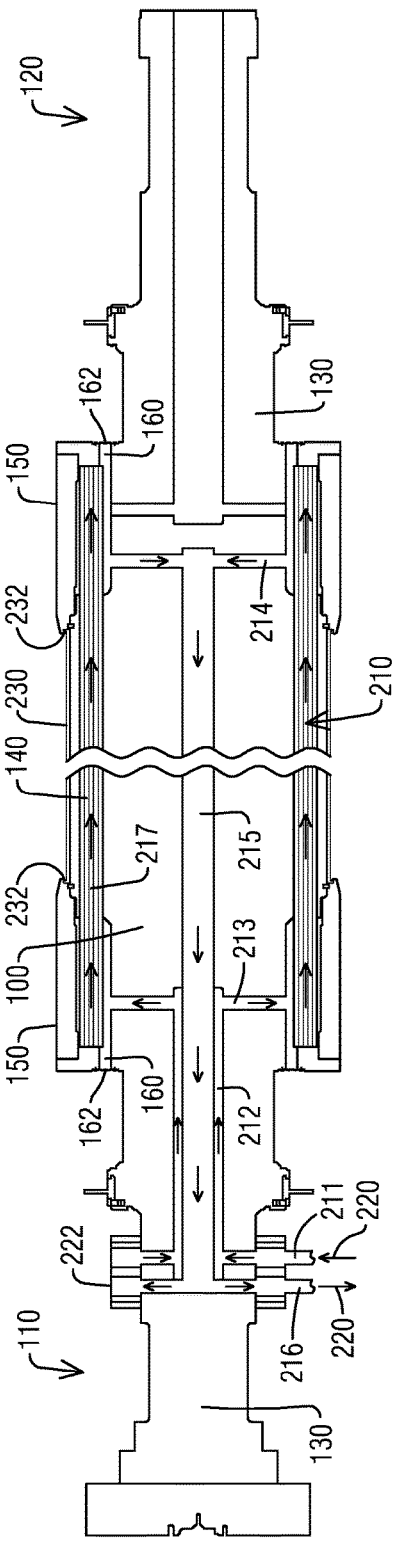

SYSTEM AND METHOD FOR COOLING WINDINGS OF GENERATOR ROTOR

TECHNICAL FIELD

The present invention relates generally to a system and a method for cooling windings of a generator rotor.

DESCRIPTION OF RELATED ART

Generator is a component that coverts mechanical power to electrical power in power generation industry. Generator typically includes a stator and a rotor each comprised of a plurality of electrical conductors, such as windings. During generator operation, windings of generator rotors are normally cooled by either air or hydrogen. Hydrogen may provide more efficient cooling. However, hydrogen is subject to explosion proof requirements that may make the generator much more costly. Windings of generator rotors may also be water cooled. However, water cooled generator rotors may require more complexity of piping and cost to migrate risk of leakage.

As power density of a generator increases, use of hydrogen to cool windings of a generator rotor may be required. Explosion requirements may be met by design a generator frame to act as a pressure vessel. Windings of a generator rotor may also be cooled by water at a high power density. Either of the cooling methods may result in high cost and more complexity.

SUMMARY OF INVENTION

Briefly described, aspects of the present invention relate to a system and a method for cooling windings of a generator rotor, in particular, for direct cooling windings of a high power density generator rotor using a non-explosive coolant.

According to an aspect, a system for cooling windings of a generator rotor is presented. The rotor comprises a retaining ring at a turbine end side and a retaining ring at an excitation end side. The rotor has an integral rotor shaft extension axially extending out the retaining rings. The system comprises a cooling passage. The cooling passage comprises an inlet radial bore radially extending into the rotor shaft extension. The cooling passage comprises an inlet axial bore connected to the inlet radial bore. The inlet axial bore axially extends within the rotor shaft extension to an axial location under the retaining ring at the turbine end side. The cooling passage comprises a first radial bore connected to the inlet axial bore. The first radial bore radially extends from a cavity under the retaining ring at the turbine end side into the rotor shaft extension. The cooling passage comprises a second radial bore radially extending from a cavity under the retaining ring at the excitation end side into the rotor shaft extension. The cooling passage comprises an outlet axial bore connected to the second radial bore. The outlet axial bore axially extends within the rotor shaft extension from an axial location under the retaining ring at the excitation end side. The cooling passage comprises an outlet radial bore connected to the outlet axial bore. The outlet radial bore radially extends into the rotor shaft extension. The cooling passage comprises an axial passage through the windings from the cavity under the retaining ring at the turbine end side to the cavity under the retaining ring at the excitation end side. The cooling system comprises a coolant for cooling the windings. The coolant enters into the cooling passage through the inlet radial bore, axially flows within the rotor shaft extension through the inlet axial bore, enters into the windings from the cavity under the retaining ring at the turbine end side through the first radial bore, axially flows through the windings from the turbine end side to the excitation end side through the axial passage, radially flows inwardly into the rotor shaft extension from the cavity under the retaining ring at the excitation end side through the second radial bore, axially flows within the rotor shaft extension through the outlet axial bore, and exits the cooling passage through the outlet radial bore.

According to an aspect, a method for cooling windings of a generator rotor is presented. The rotor comprises a retaining ring at a turbine end side and a retaining ring at an excitation end side. The rotor has an integral rotor shaft extension axially extending out the retaining rings. The method comprises arranging a cooling passage. The cooling passage comprises an inlet radial bore radially extending into the rotor shaft extension. The cooling passage comprises an inlet axial bore connected to the inlet radial bore. The inlet axial bore axially extends within the rotor shaft extension to an axial location under the retaining ring at the turbine end side. The cooling passage comprises a first radial bore connected to the inlet axial bore. The first radial bore radially extends from a cavity under the retaining ring at the turbine end side into the rotor shaft extension. The cooling passage comprises a second radial bore radially extending from a cavity under the retaining ring at the excitation end side into the rotor shaft extension. The cooling passage comprises an outlet axial bore connected to the second radial bore. The outlet axial bore axially extends within the rotor shaft extension from an axial location under the retaining ring at the excitation end side. The cooling passage comprises an outlet radial bore connected to the outlet axial bore. The outlet radial bore radially extends into the rotor shaft extension. The cooling passage comprises an axial passage through the windings from the cavity under the retaining ring at the turbine end side to the cavity under the retaining ring at the excitation end side. The method comprises cooling the windings using a coolant traveling through the cooling passage. The coolant enters into the cooling passage through the inlet radial bore, axially flows within the rotor shaft extension through the inlet axial bore, enters into the windings from the cavity under the retaining ring at the turbine end side through the first radial bore, axially flows through the windings from the turbine end side to the excitation end side through the axial passage, radially flows inwardly into the rotor shaft extension from the cavity under the retaining ring at the excitation end side through the second radial bore, axially flows within the rotor shaft extension through the outlet axial bore, and exits the cooling passage through the outlet radial bore.

Various aspects and embodiments of the application as described above and hereinafter may not only be used in the combinations explicitly described, but also in other combinations. Modifications will occur to the skilled person upon reading and understanding of the description.

BRIEF DESCRIPTION OF DRAWINGS

Exemplary embodiments of the application are explained in further detail with respect to the accompanying drawings. In the drawings:

FIGS. 5 to 7 illustrate schematic cross section views of a cooling system for cooling generator rotor windings having a casing according to various embodiments of the invention.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
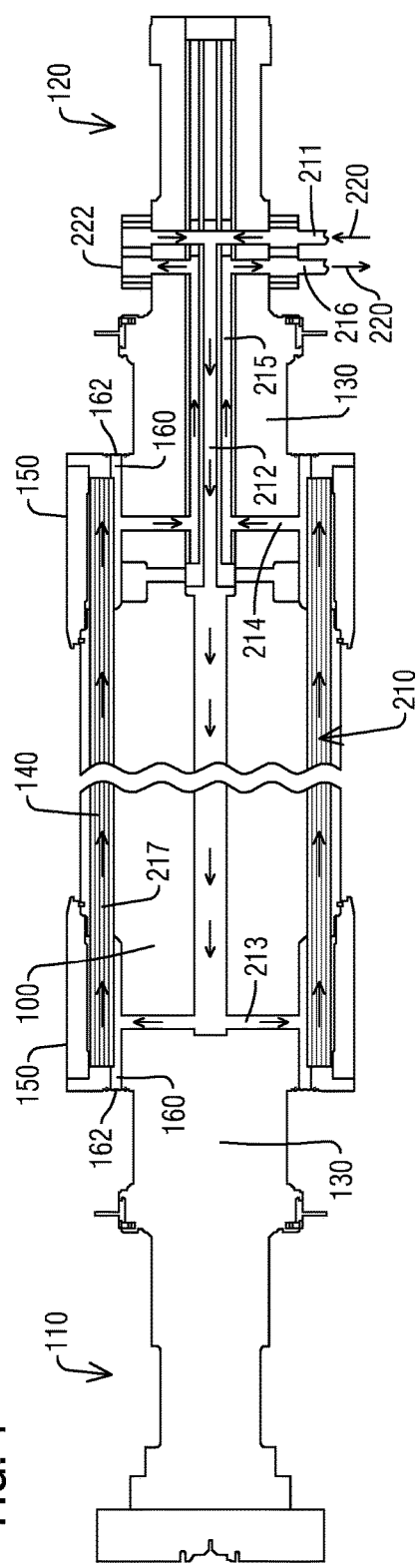
FIGS. 1 to 3 illustrate schematic cross section views of a cooling system for cooling generator rotor windings according to various embodiments of the invention.

FIG. 1 illustrates a schematic cross section view of a cooling system 200 for cooling generator rotor windings 140 according to an embodiment of the invention. A generator rotor 100 has two axial ends toward to a turbine end side 110 and an excitation end side 120. The rotor 100 may have windings 140. The windings 140 have axial portions that are axially placed along the rotor 100 within winding channels (not shown). The windings 140 are turned at the two axial ends of the rotor 100. Two retaining rings 150 are coupled to the rotor 100 at the two axial ends toward the turbine end side 110 and the excitation end side 120, respectively. The rotor 100 has an integral rotor shaft extension 130 axially extends out of the retaining rings 150. The retaining rings 150 may enclose the windings 140 at the two axial ends. A cavity 160 may exist under each of the retaining rings 150 and the rotor shaft extension 130.

An exemplary embodiment of a cooling system 200 for cooling the rotor windings 140 during generator operation is illustrated with reference to FIG. 1. The cooling system 200 includes a cooling passage 210. The cooling passage 210 includes an inlet radial bore 211 located at an axial end side of the rotor shaft extension 130. The inlet radial bore 211 radially extends into the rotor shaft extension 130. The cooling passage 210 includes an inlet axial bore 212 connected to the inlet radial bore 211. The inlet axial bore axially extends within the rotor shaft extension 130 to an axial location under the retaining ring 150 at the turbine end side 110. The cooling passage 210 includes a first radial bore 213 connected to the inlet axial bore 212. The first radial bore 213 radially extends from the cavity 160 under the retaining ring 150 at the turbine end side 110 into the rotor shaft extension 130. The cooling passage 210 includes a second radial bore 214. The second radial bore 214 radially extends from the cavity 160 under the retaining ring 150 at the excitation end side 120 into the rotor shaft extension 130. The cooling passage 210 includes an outlet axial bore 215 connected to the second radial bore 214. The outlet axial bore 215 axially extends within the rotor shaft extension 130 from an axial location under the retaining ring 150 at the excitation end side 120. The cooling passage 210 includes an outlet radial bore 216 connected to the outlet axial bore 215. The outlet radial bore 216 may be located at an axial end side of the rotor shaft extension 130. The outlet radial bore 216 radially extends into the rotor shaft extension 130. The cooling passage 210 includes an axial passage 217 through the windings 140 from the cavity 160 under the retaining ring 150 at the turbine end side 110 to the cavity 160 under the retaining ring 150 at the excitation end side 120.

The cooling system includes a coolant 220. The coolant 220 enters into the cooling passage 210 through the inlet radial bore 211 and radially travels inward into the rotor shaft extension 130. The coolant 220 axially travels within the rotor shaft extension 130 through the inlet axial bore 212. The coolant 220 enters into the windings 140 from the cavity 160 under the retaining ring 150 at the turbine end side 110 through the first radial bore 213. The coolant 220 axially flows through the windings 140 from the turbine end side 110 to the excitation end side 120 through the axial passage 217 for directly cooling the windings 140. The coolant 220 radially flows inwardly into the rotor shaft extension 130 from the cavity 160 under the retaining ring 150 at the excitation end side 120 through the second radial bore 214 after cooling the windings 140. The coolant 220 axially flows within the rotor shaft extension 130 through the outlet axial bore 215. The coolant 220 radially flows outward from the rotor shaft extension 130 and exits the cooling passage 210 through the outlet radial bore 216. The coolant 220 may enter into a cooling and pumping system (not shown) after exiting the cooling passage 210, and may return back into the cooling passage 210 for continuously cooling the windings 140 during operation.

According to an embodiment, the coolant 220 may include a non-explosive fluid, such as R134a, Helium, dielectric cooling liquid, or compressed air. R134a may be pressurized, such as to 2 or 3 bar absolute pressure. Air may be pressurized, such as to 4 to 12 bar absolute pressure. The cooling system 200 may sufficiently cool rotor windings 140 in a high power density generator using a coolant 220 that eliminates using explosive hydrogen as a rotor coolant.

With reference to the exemplary embodiment illustrated in FIG. 1, the inlet radial bore 211 and the outlet radial bore 216 are located at the rotor shaft extension 130 at the excitation end side 120. A coolant seal 222 may be placed at the rotor shaft extension 130 at an area of the inlet radial bore 211 and the outlet radial bore 216. The coolant seal 222 may seal the inlet radial bore 211 and the outlet radial bore 216 from external environment. The inlet axial bore 212 may be located at center of the rotor shaft extension 130 axially extending from the excitation end side 120 to an axial location under the retaining ring 150 at the turbine end side 110. The outlet axial bore 215 may be separated from the inlet axial bore 212 at an outward radial location of the rotor shaft extension 130 at the excitation end side 120.

Figure 2:
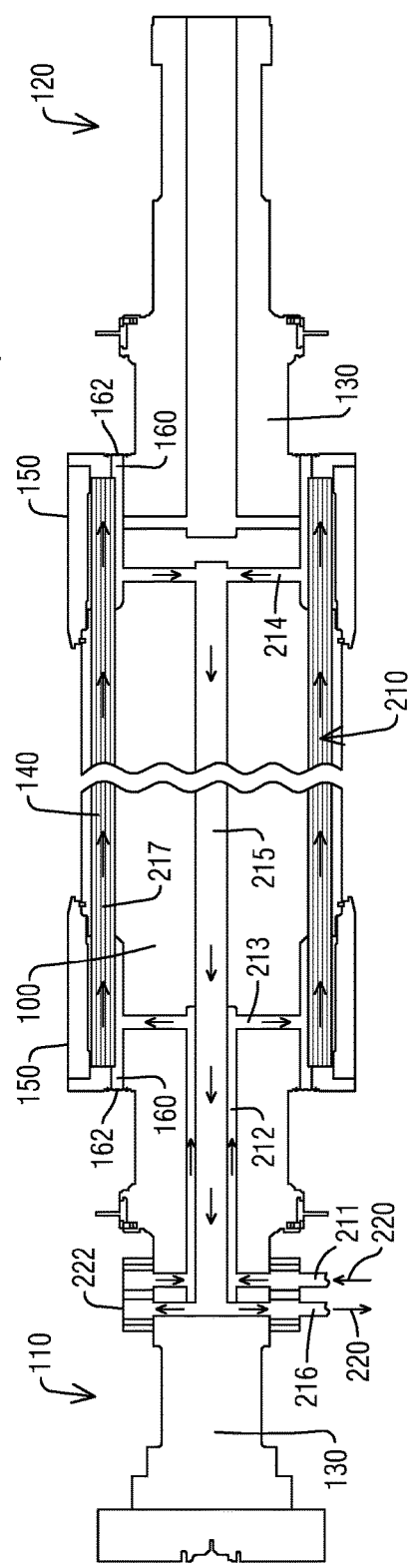

FIG. 2 illustrates a schematic cross section view of a cooling system 200 for cooling generator rotor windings 140 according to an embodiment of the invention. In the exemplary embodiment illustrated in FIG. 2, an inlet radial bore 211 and an outlet radial bore 216 are located at a rotor shaft extension 130 at turbine end side 110. A coolant seal 222 may be placed at the rotor shaft extension 130 at an area of the inlet radial bore 211 and the outlet radial bore 216. The coolant seal 222 may seal the rotor shaft extension 130 at the area of the inlet radial bore 211 and the outlet radial bore 216 from external environment. An outlet axial bore 215 may be located at center of the rotor shaft extension 130 axially extending from an axial location under a retaining ring 150 at excitation end side 120 to the turbine end side 110. An inlet axial bore 212 may be separated from the outlet axial bore 215 at an outward radial location of the rotor shaft extension 130 at the turbine end side 110.

Figure 3:
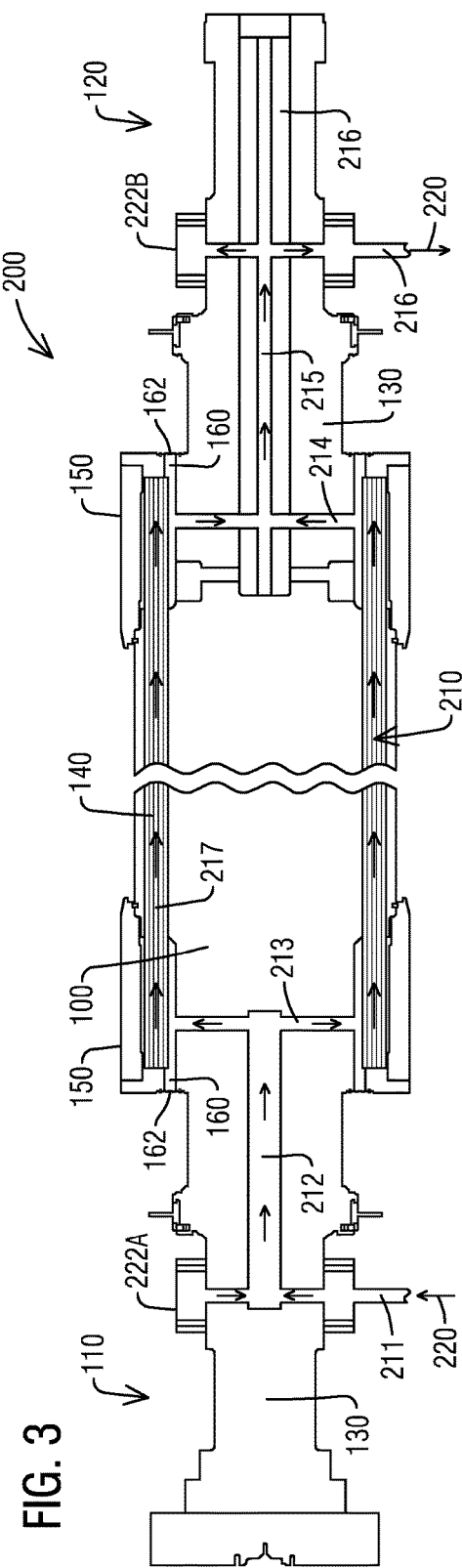

FIG. 3 illustrates a schematic cross section view of a cooling system 200 for cooling generator rotor windings 140 according to an embodiment of the invention. In the exemplary embodiment illustrated in FIG. 3, an inlet radial bore 211 is located at a rotor shaft extension 130 at turbine end side 110. An outlet radial bore 216 is located at the rotor shaft extension 130 at excitation end side 120. An inlet coolant seal 222A may be placed at the rotor shaft extension 130 at an area of the inlet radial bore 211. An outlet coolant seal 222B may be placed at the rotor shaft extension 130 at an area of the outlet radial bore 216. The inlet coolant seal 222A and the outlet coolant seal 22B may seal the rotor shaft extension 130 at the area of the inlet radial bore 211 and at the area of the outlet radial bore 216 from external environment. An inlet axial bore 215 may be located at center of the rotor shaft extension 130 axially extending to an axial location under a retaining ring 150 at the turbine end side 110. An outlet axial bore 212 may be located at center of the rotor shaft extension 130 axially extending from an axial location under a retaining ring 150 at the excitation end side 120.

Figure 4:
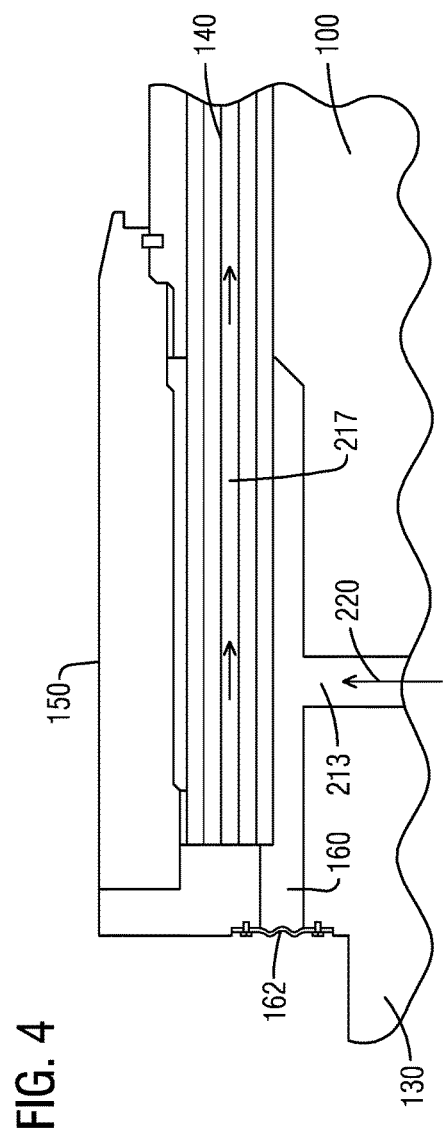
FIG. 4 illustrates a schematic enlarged cross section view in vicinity of a retaining ring of the various embodiments of the cooling systems shown in FIGS. 1 to 3.

FIG. 4 illustrates a schematic enlarged cross section view in vicinity of a retaining ring 150 of the various embodiments of the cooling systems 200 shown in FIGS. 1 to 3. With reference to the exemplary embodiment in FIG. 4, the cooling system 200 may include a bellows seal 162. The bellows seal 162 may be placed between an outboard side of the retaining ring 150 and a rotor shaft extension 130. The bellows seal 162 may seal a cavity 160 under the retaining ring 150 at an outboard side. The bellows seal 162 may also allow a relative radial motion between the retaining ring 150 and the rotor shaft extension 130. The bellows seal 162 may consist of stainless steel.

Figure 7:
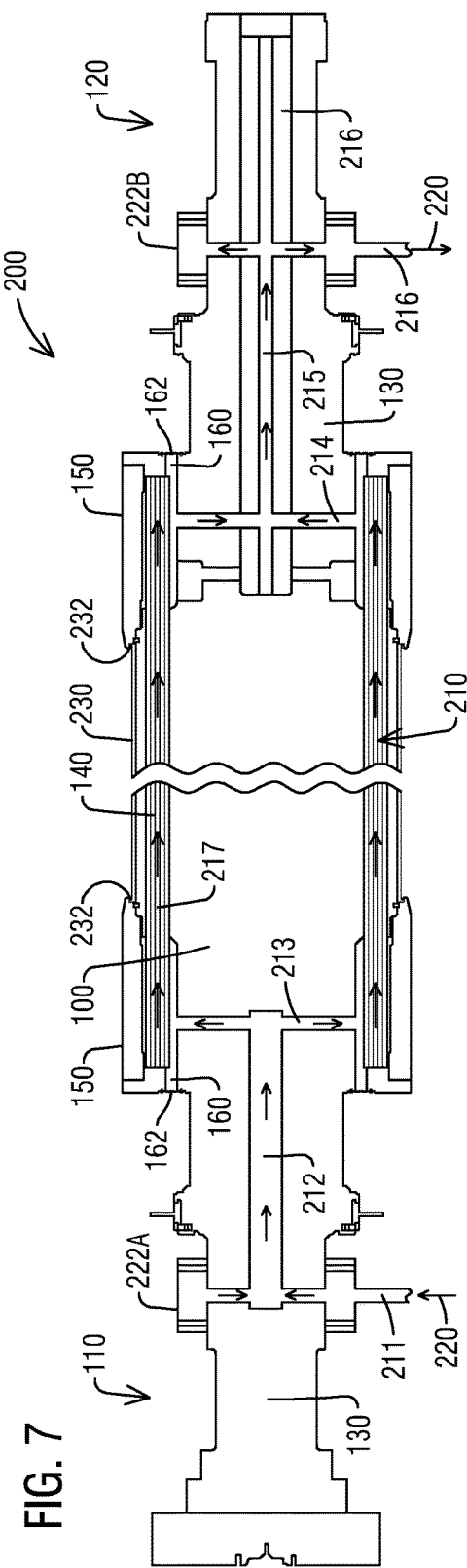

FIGS. 5 to 7 illustrate schematic cross section views of a cooling system 200 for cooling generator rotor windings 140 according to various embodiments of the invention. With reference to the exemplary embodiments in FIGS. 5 to 7, the cooling system 200 may include a cylindrical casing 230 between a retaining ring 150 at turbine end side 110 and a retaining ring 150 at excitation end side 120. The cylindrical casing 230 may circumferentially enclose the rotor windings 140 from the retaining ring 150 at the turbine end side 110 to the retaining ring 150 at the excitation end side 120. The cylindrical casing 230 may enclose a coolant 220 within the cylindrical casing 230 when traveling through the windings 140. The embodiments of FIGS. 5 to 7 otherwise correspond to the embodiments of FIGS. 1 to 3 respectively. Corresponding parts of FIGS. 5 to 7 are correspondingly numbered, and are not described again with reference to FIGS. 5 to 7.

Figure 8:
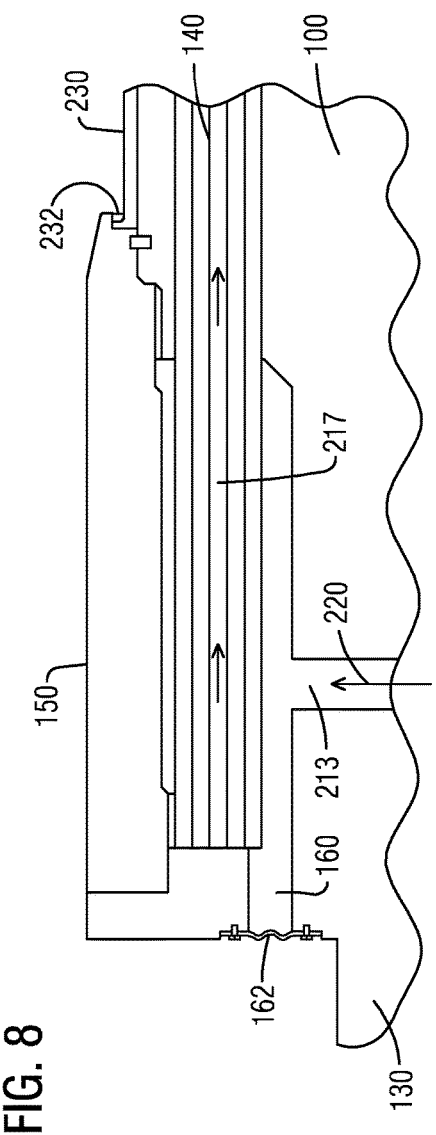
FIG. 8 illustrates a schematic enlarged cross section view of in vicinity of a retaining ring of the various embodiments of the cooling systems shown in FIGS. 5 to 7.

FIG. 8 illustrates a schematic enlarged cross section view in vicinity of a retaining ring 150 of the various embodiments of the cooling systems 200 shown in FIGS. 5 to 7. With reference to the exemplary embodiment in FIG. 8, the cooling system 200 may include a casing seal 232. The casing seal 232 may be placed under a retaining ring 150. The casing seal 232 may seal an area under the retaining ring 150 and the cylindrical casing 230. The embodiment of FIG. 8 otherwise correspond to the embodiment of FIG. 4. Corresponding parts of FIG. 8 is correspondingly numbered, and are not described again with reference to FIG. 8.

According to an aspect, the proposed system 200 and method for cooling rotor windings 140 may replace explosive hydrogen as a rotor coolant with a coolant 220 that is non-explosive. By eliminating hydrogen as a rotor coolant, the proposed system 200 and method may increase safety of a power plant and reduce the number of inspections and hazards associated with combustible gas. The presented system 200 and method may also reduce insurance cost of a power plant. The proposed system 200 and method may eliminate explosive-proof containment frame and auxiliaries associated with hydrogen handling and thus reduce cost of a power plant.

According to an aspect, the proposed system 200 and method provide a simple and inexpensive direct cooling of rotor windings 140 using a non-explosive coolant 220. By comparison, a water cooled rotors requires extensive piping to directly cool rotor windings.

According to an aspect, the proposed system 200 and method provide sufficiently direct cooling of rotor windings 140 using a non-explosive coolant 220 in a high power density generator, for example, a generator rated above 550 MVA.

According to an aspect, the proposed system 200 and method separates cooling circuits for generator rotor and stator, eliminating constraints that are unique to each circuit from the other. The proposed system 200 and method may make generator more serviceable, such as split frame construction, easy disassembly, and no degassing.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

100: Generator Rotor
110: Turbine End Side
120: Excitation End Side
130: Rotor Shaft Extension
140: Windings
150: Retaining Ring
160: Cavity under Retaining Ring and Rotor Shaft Extension
162: Bellows Seal
200: Cooling System
210: Cooling Passage
211: Inlet Radial Bore
212: Inlet Axial Bore
213: First Radial Bore
214: Second Radial Bore
215: Outlet Axial Bore
216: Outlet Radial Bore
217: Axial Passage Through Windings
220: Coolant
222: Coolant Seal
222A: Coolant Inlet Seal
222B: Coolant outlet Seal
230: Cylindrical Casing
232: Casing Seal What claimed is:

1. A system for cooling windings of a generator rotor, wherein the rotor comprises a retaining ring at a turbine end side and a retaining ring at an excitation end side, wherein the rotor has an integral rotor shaft extension axially extending out the retaining rings, the system comprising:

a cooling passage comprising:
- an inlet radial bore radially extending into the rotor shaft extension;
- an inlet axial bore connected to the inlet radial bore, wherein the inlet axial bore axially extends within the rotor shaft extension to an axial location under the retaining ring at the turbine end side;
- a first radial bore connected to the inlet axial bore, wherein the first radial bore radially extends from a cavity under the retaining ring at the turbine end side into the rotor shaft extension;
- a second radial bore radially extending from a cavity under the retaining ring at the excitation end side into the rotor shaft extension;
- an outlet axial bore connected to the second radial bore, wherein the outlet axial bore axially extends within the rotor shaft extension from an axial location under the retaining ring at the excitation end side;
- an outlet radial bore connected to the outlet axial bore, wherein the outlet radial bore radially extends into the rotor shaft extension; and
- an axial passage through the windings from the cavity under the retaining ring at the turbine end side to the cavity under the retaining ring at the excitation end side; and a coolant for cooling the windings,
wherein the coolant enters into the cooling passage through the inlet radial bore, axially flows within the rotor shaft extension through the inlet axial bore, enters into the windings from the cavity under the retaining ring at the turbine end side through the first radial bore, axially flows through the windings from the turbine end side to the excitation end side through the axial passage, radially flows inwardly into the rotor shaft extension from the cavity under the retaining ring at the excitation end side through the second radial bore, axially flows within the rotor shaft extension through the outlet axial bore, and exits the cooling passage through the outlet radial bore.

2. The system as claimed in claim 1, wherein the inlet radial bore and the outlet radial bore are located at the rotor shaft extension at the excitation end side.

3. The system as claimed in claim 1, wherein the inlet radial bore and the outlet radial bore are located at the rotor shaft extension at the turbine end side.

4. The system as claimed in claim 1, wherein the inlet radial bore is located at the rotor shaft extension at the turbine end side, and wherein the outlet radial bore is located at the rotor shaft extension at the excitation end side.

5. The system as claimed in claim 1, further comprising a coolant seal that seals an area of the rotor shaft extension at the inlet radial bore and the outlet radial bore.

6. The system as claimed in claim 1, further comprising a coolant inlet seal that seals an area of the rotor shaft extension at the inlet radial bore and a coolant outlet seal that seals an area of the rotor shaft extension at the outlet radial bore.

7. The system as claimed in claim 1, further comprising a bellows seal for sealing the cavity under the retaining ring at an outboard side.

8. The system as claimed in claim 1, further comprising a cylindrical casing circumferentially enclosing the windings from the retaining ring at the turbine end side to the retaining ring at the excitation end side for enclosing the coolant within the cylindrical casing when traveling through the windings.

9. The system as claimed in claim 8, further comprising a casing seal for sealing an area under the retaining ring and the cylindrical casing.

10. The system as claimed in claim 1, wherein the coolant comprises a non-explosive fluid comprising R134a, Helium, dielectric cooling liquid, or compressed air.

11. A method for cooling windings of a generator rotor comprising a rotor, wherein the rotor comprises a retaining ring at a turbine end side and a retaining ring at an excitation end side, wherein the rotor has an integral rotor shaft extension axially extending out the retaining rings, the method comprising:

arranging a cooling passage comprising:
- an inlet radial bore radially extending into the rotor shaft extension;
- an inlet axial bore connected to the inlet radial bore, wherein the inlet axial bore axially extends within the rotor shaft extension to an axial location under the retaining ring at the turbine end side;
- a first radial bore connected to the inlet axial bore, wherein the first radial bore radially extends from a cavity under the retaining ring at the turbine end side into the rotor shaft extension;
- a second radial bore radially extending from a cavity under the retaining ring at the excitation end side into the rotor shaft extension;
- an outlet axial bore connected to the second radial bore, wherein the outlet axial bore axially extends within the rotor shaft extension from an axial location under the retaining ring at the excitation end side; and
- an outlet radial bore connected to the outlet axial bore, wherein the outlet radial bore radially extends into the rotor shaft extension; and
- an axial passage through the windings from the cavity under the retaining ring at the turbine end side to the cavity under the retaining ring at the excitation end side; and cooling the windings using a coolant traveling through the cooling passage,
wherein the coolant enters into the cooling passage through the inlet radial bore, axially flows within the rotor shaft extension through the inlet axial bore, enters into the windings from the cavity under the retaining ring at the turbine end side through the first radial bore, axially flows through the windings from the turbine end side to the excitation end side through the axial passage, radially flows inwardly into the rotor shaft extension from the cavity under the retaining ring at the excitation end side through the second radial bore, axially flows within the rotor shaft extension through the outlet axial bore, and exits the cooling passage through the outlet radial bore.

12. The method as claimed in claim 11, wherein the inlet radial bore and the outlet radial bore are located at the rotor shaft extension at the excitation end side.

13. The method as claimed in claim 11, wherein the inlet radial bore and the outlet radial bore are located at the rotor shaft extension at the turbine end side.

14. The method as claimed in claim 11 wherein the inlet radial bore is located at the rotor shaft extension at the turbine end side, and wherein the outlet radial bore is located at the rotor shaft extension at the excitation end side.

15. The method as claimed in claim 11, further comprising sealing an area of the rotor shaft extension at the inlet radial bore and the outlet radial bore by a coolant seal.

16. The method as claimed in claim 11, further comprising sealing an area of the rotor shaft extension at the inlet radial bore by a coolant inlet seal and sealing an area of the rotor shaft extension at the outlet radial bore by a coolant outlet seal.

17. The method as claimed in claim 11, further comprising sealing the cavity under the retaining ring at an outboard side by a bellows seal.

18. The method as claimed in claim 11, further comprising circumferentially enclosing the windings by a cylindrical casing between the retaining ring at the turbine end side and the retaining ring at the excitation end side for enclosing the coolant within the cylindrical casing when traveling through the windings.

19. The method as claimed in claim 18, further comprising sealing an area under the retaining ring and the cylindrical casing by a casing seal.

20. The method as claimed in claim 11, wherein the coolant comprises a non-explosive fluid comprising R134a, Helium, dielectric cooling liquid and compressed air.

\* \* \* \* \*